Patented Sept. 19, 1933

1,927,125

UNITED STATES PATENT OFFICE 1,927,125

ACID WOOL-DYESTUFF OF THE ANTHRAQUINONE SERIES AND PROCESS OF MAKING SAME

Georg Kalischer, Frankfort-on-the-Main, Ernst Honold, Frankfort-on-the-Main-Fechenheim, Heinrich Clingestein, Cologne-on-the-Rhine, and Karl Dobmaier, Leverkusen-on-the-Rhine, Germany, assignors to General Aniline Works, Inc., New York, N. Y., a corporation of Delaware No Drawing. Application July 7, 1930, Serial No. 466,346, and in Germany July 17, 1929

10 Claims. (Cl. 260—60)

Our present invention relates to acid wool-dyestuffs of the anthraquinone series and to a process of making same.

This process comprises treating with acylating agents an 1-amino-4-aryl-amino-anthraquinone-2-sulfonic acid of the general formula:

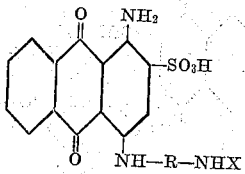

wherein R means a residue of the benzene series and X hydrogen, alkyl or cycloalkyl.

Suitable acylating agents are for instance acid anhydrides, carboxylic or sulfonic acid chlorides such as acetyl-chloride, mono- and dichloro-acetyl-chloride, acetic anhydride, benzoyl-chloride, benzene-sulfochloride, phthalic anhydride. When an acid chloride is used, an acid-binding agent may be added with advantage. The process may be carried out either in an aqueous medium or by using dried starting materials in an organic solvent particularly an organic base.

By the acylation of anthraquinone dyestuffs which is the object of our present invention, dyestuffs are obtained which are distinguished from the starting materials by a more bluish shade and by improved tinctorial properties, especially as regards levelling.

They correspond probably to the general formula:

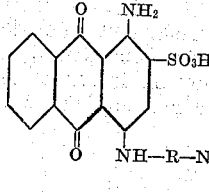

(wherein R and X have the above signification).

Of a special value are those of these dyestuffs which contain halogen in their acyl-residue.

In order to further illustrate our invention the following examples are given, the parts being by weight and all temperatures in centigrade degrees, but we wish it however to be understood, that our invention is not limited to the particular products nor reacting conditions mentioned therein:—

Example 1

20 parts of 1-amino-4-(p-aminophenyl)-amino-anthraquinone-2-sulfonic acid, obtained by condensation of 1-amino-4-bromo-anthraquinone-2-sulfonic acid with p-phenylene-diamine, are dissolved in about 1000 parts of hot water and at 60–70° acetic-anhydride is slowly added until complete acetylation of the one amino-group. Thereby the original greenish blue color of the solution turns to a more bluish color. The formed dyestuff is salted out by means of sodium chloride. It corresponds to the formula:

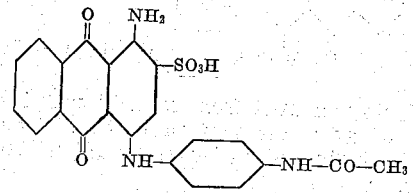

The coloration of its solution in concentrated sulfuric acid is greenish blue. It dyes the animal fiber very equal greenish blue shades.

By employing instead of acetic-anhydride, benzoyl-chloride, phthalic-anhydride or similar acylation agents analogous products are obtained.

The dyestuff obtained in an analogous manner by acetylation of the condensation product of 1-amino-4-bromo-anthraquinone-2-sulfonic acid and m-phenylene-diamine dyes wool from an acid bath pure blue shades.

Example 2

20 parts of the dyestuff, obtained by condensation of 1-amino-4-bromo-anthraquinone-2-sulfonic acid with benzidine, are treated with acetic-anhydride according to Example 1 and worked up as there described. The acetylated dyestuff corresponds to the formula:

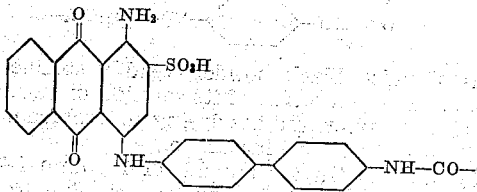

It dissolves in concentrated sulfuric acid with a reddish color, which becomes blue after the addition of paraformaldehyde. The dyeing on wool from an acid path is a full greenish blue shade of an excellent fastness.

Example 3

20 parts of the dyestuff, obtained by condensation of 1-amino-4-bromo-anthraquinone-2-sulfonic acid with monoethyl-para-phenylene-diamine, are treated in an aqueous solution with acetic anhydride according to Example 1. The formed dyestuff is salted out as sodium salt. It dyes wool from an acid bath reddish blue shades and is identical with the dyestuff obtained by condensation of 1-amino-4-bromo-anthraquinone-2-sulfonic acid with acetyl-ethyl-para-phenylene-diamine (see U. S. Patent No. 1,750,227).

The acetylation may be carried out with the same result by dissolving the starting dyestuff in pyridine and stirring the mixture for some time after the addition of acetyl-chloride at ordinary temperature. After diluting with water the acetylated dyestuff may be salted out.

Example 4

20 parts of the dyestuff, obtained by condensation of 1-amino-4-bromo-anthraquinone-2-sulfonic acid with para-phenylene-diamine thiosulfonic acid, are treated with 40 parts of acetic anhydride in an aqueous solution according to Example 1. Then the acylated dyestuff is separated. It corresponds possibly to the formula:

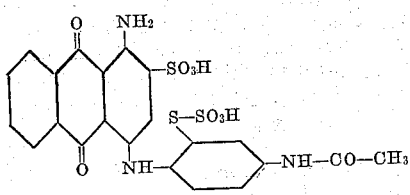

The dyeing on wool from an acid bath is a blue shade of good fastness properties. The dyestuff is distinguished by an excellent levelling power.

Example 5

23.2 parts of the sodium salt of 1-amino-4-(p-amino-phenyl)-amino-anthraquinone-2-sulfonic acid are dissolved in 5000 parts of water, cooled to 0–10° and 20 parts of chloro-acetyl-chloride are dropped into the solution with good stirring, the solution being maintained weakly alkaline throughout by the addition of sodium carbonate or sodium acetate. The coloration of the solution is thereby changed to reddish blue. The dyestuff formed is salted out and dried. It corresponds to the formula:

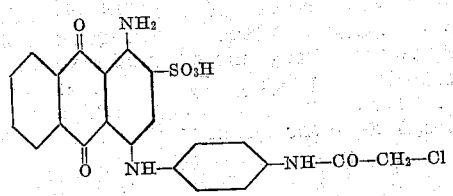

It is a bluish black powder, readily soluble in water. The coloration of its solution in sulfuric acid is blue-green and the dyeing on wool from an acid bath is a clear blue shade.

By treating the sodium salt of 1-amino-4-(p-amino-phenyl)-amino-anthraquinone-2-sulfonic acid with chloro-acetic anhydride according to Example 1 the same dyestuff is obtained.

Example 6

15 parts of the sodium salt of 1-amino-4-(m-amino-phenyl)-amino-anthraquinone-2-sulfonic acid are dissolved in 3000 parts of water, the solution is cooled and 12 parts of chloro-acetyl-chloride are added, the solution being maintained weakly alkaline throughout. When the dyestuff formation is complete the dyestuff is salted out. It corresponds to the formula:

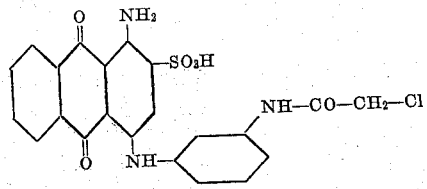

It dyes wool full clear reddish blue shades, fast to fulling and light. The capacity for even dyeing of the dyestuff is very good.

Example 7

36 parts of the sodium salt of 1-amino-4-(m-ethylaminophenyl)-amino-anthraquinone-2-sulfonic acid are dissolved in 6000 parts of water and at 10°, 20 parts of chloro-acetyl chloride are added. During the reaction the solution is maintained weakly alkaline by continually dropping in a solution of sodium carbonate. The resulting dyestuff dyes wool a clear powerful blue shade. It corresponds to the formula:

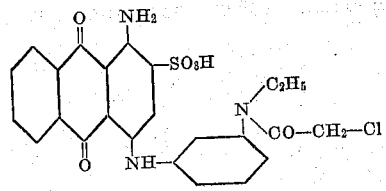

Example 8

By employing 34 parts of the sodium salt of 1-amino-4-(p-methyl-aminophenyl)-amino-anthraquinone-2-sulfonic acid instead of the m-ethylaminophenyl derivative in Example 7 a dyestuff of similar good properties is obtained when following the same procedure. It corresponds to the formula:

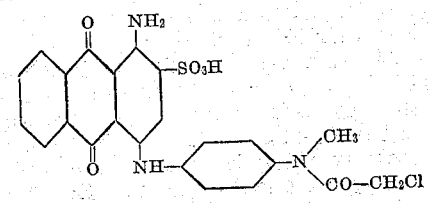

Example 9

16 parts of the sodium salt of 1-amino-4-(m-amino-phenyl)-amino-anthraquinone-2-sulfonic acid are dissolved in 3000 parts of water and 18 parts of dichloro-acetyl chloride are dropped into the solution with good stirring at 10°. When the dyestuff formation is complete the dyestuff is salted out. It corresponds to the formula:

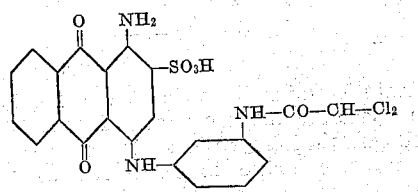

It dyes wool from an acid bath a powerful and clear blue shade.

Example 10

16.5 parts of the sodium salt of 1-amino-4-(m-amino-phenyl)-amino-anthraquinone-2-sulfonic acid are dissolved in about 3000 parts of water and 12 parts of β-chloro-propionyl chloride are introduced into the cooled solution which is maintained alkaline throughout the reaction. The dyestuff is separated in the customary manner. It corresponds to the formula:

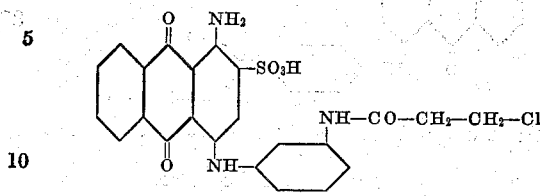

This dyestuff also dyes wool a clear blue shade.

*Example 11*

33.2 parts of the sodium salt of 1-amino-4-(p-amino-phenyl)-amino-anthraquinone-2-sulfonic acid are dissolved in about 6000 parts of water at 10–20° and treated with 20 parts of the ethylic ester of chloro-carbonic acid; the solution is maintained alkaline throughout the reaction. The dyestuff is isolated as usual. It corresponds to the formula:

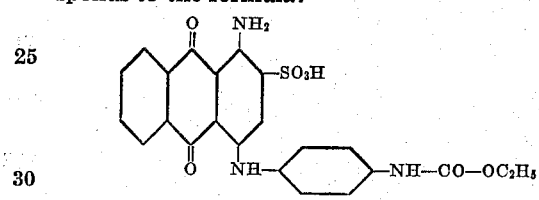

It dyes wool from an acid bath equal pure blue shades.

Instead of the above-mentioned ω-chloracyl derivatives ω-bromoacetyl-, ω-chloro- or ω-bromopropionyl halides or the corresponding dihalogen-acyl-chlorides can likewise be employed.

We claim:—

1. Process which comprises acylating an 1-amino-4-arylamino-anthraquinone-2-sulfonic acid of the general formula:

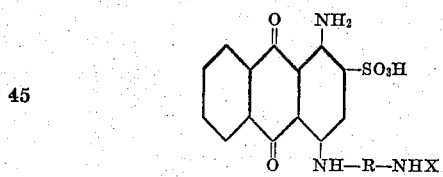

(wherein R means a radical of the benzene or diphenyl series and X hydrogen, alkyl or cyclo-alkyl) in the presence of water.

2. Process which comprises acylating an 1-amino-4-arylamino-anthraquinone-2-sulfonic acid of the general formula:

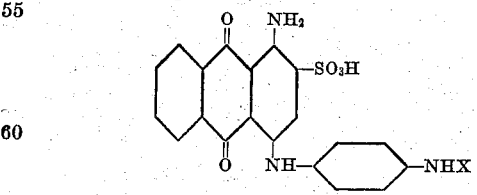

(wherein X means hydrogen, alkyl or cyclo-alkyl) in the presence of water.

3. Process which comprises acylating 1-amino-4-(4'-amino-arylamino)-anthraquinone-2-sulfonic acid of the formula:

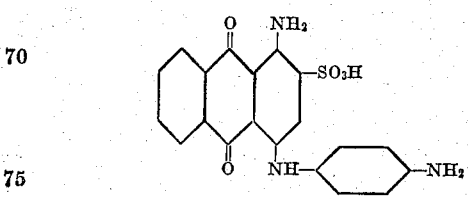

by means of an aliphatic acylating agent in the presence of water.

4. Process which comprises acylating 1-amino-4-(4'-amino-arylamino)-anthraquinone-2-sulfonic acid of the formula:

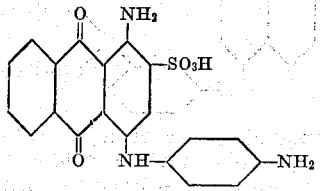

by means of an acylating agent of the group consisting of the chloride and anhydride of an aliphatic halogen-containing carboxylic acid in the presence of water.

5. As new compounds the acid wool dyestuffs of the anthraquinone series corresponding to the general formula:

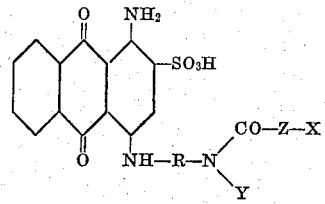

wherein R means a radicle of the benzene or diphenyl series, and wherein Z stands for an alkylene or arylene radicle, while X means halogen when Y stands for hydrogen or alkyl and Z for alkylene or wherein X means hydrogen when Y stands for hydrogen and Z for arylene.

6. As new compounds the acid wool dyestuffs of the anthraquinone series corresponding to the general formula:

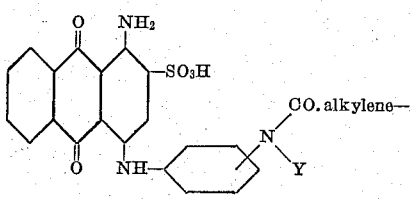

wherein X stands for halogen and Y for hydrogen or alkyl.

7. As new compounds the acid wool dyestuffs of the anthraquinone series corresponding to the general formula:

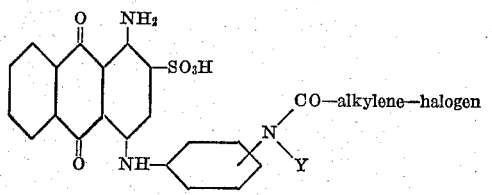

wherein Y means hydrogen, methyl or ethyl.

8. As a new compound the acid wool dyestuff of the anthraquinone series corresponding to the formula:

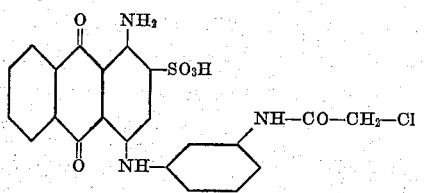

which compound dyes wool full clear reddish blue shades.